March 27, 1962 M. J. VAN ALSTYNE ET AL 3,027,216
CONCEALABLE BUILT-IN OVEN
Filed Sept. 2, 1960 5 Sheets-Sheet 1
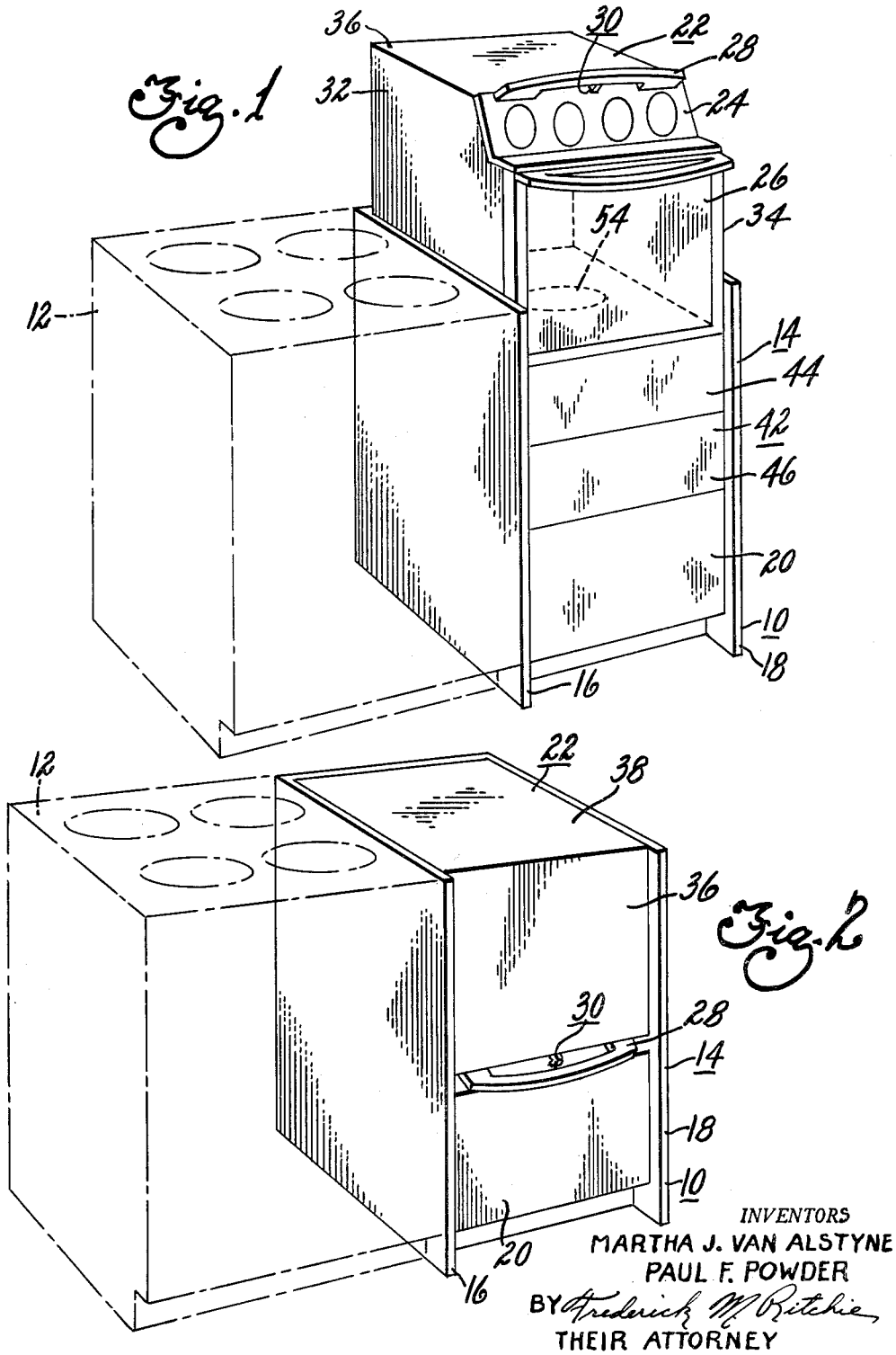
INVENTORS
MARTHA J. VAN ALSTYNE
PAUL F. POWDER
BY Frederick M Ritchie
THEIR ATTORNEY

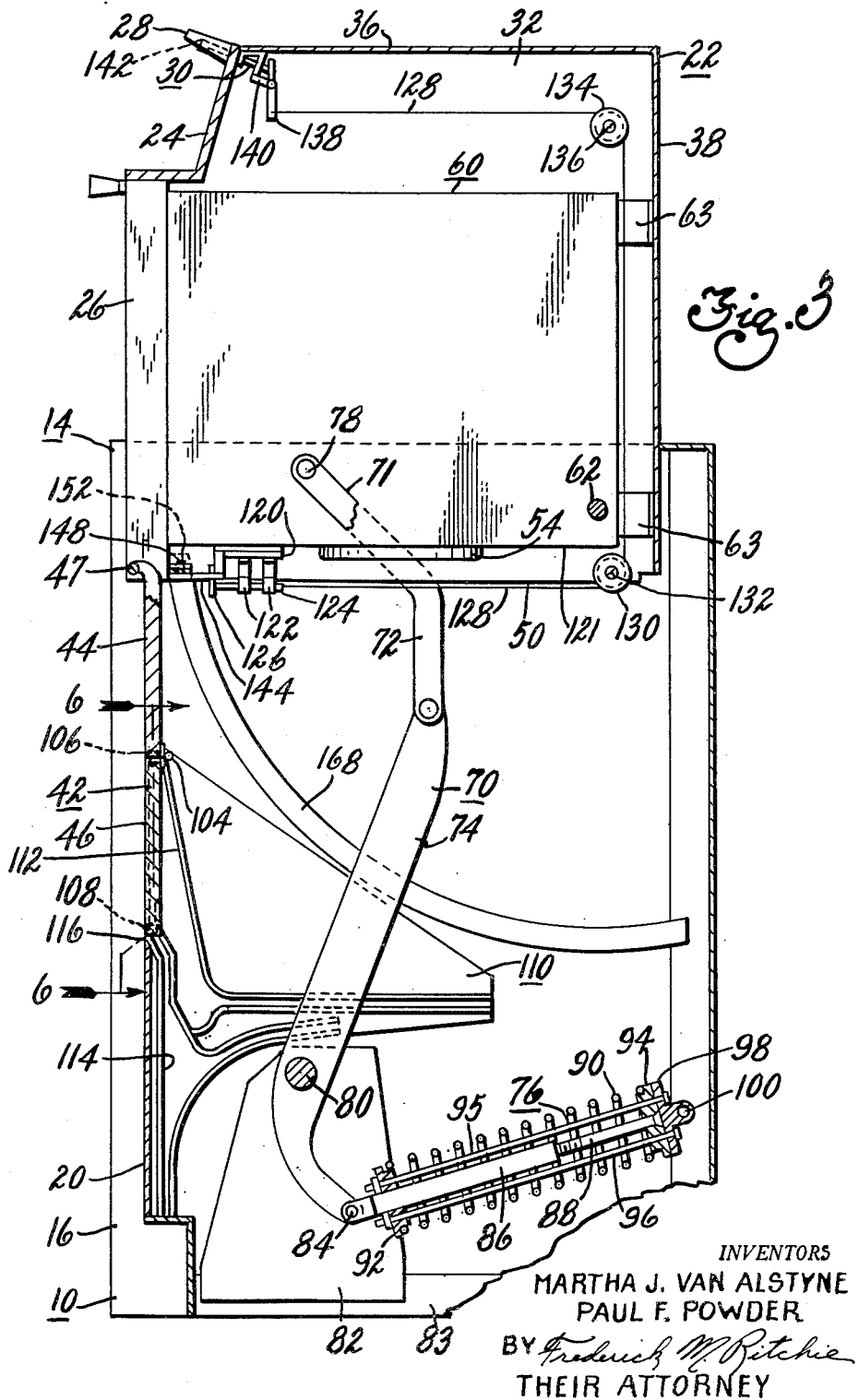

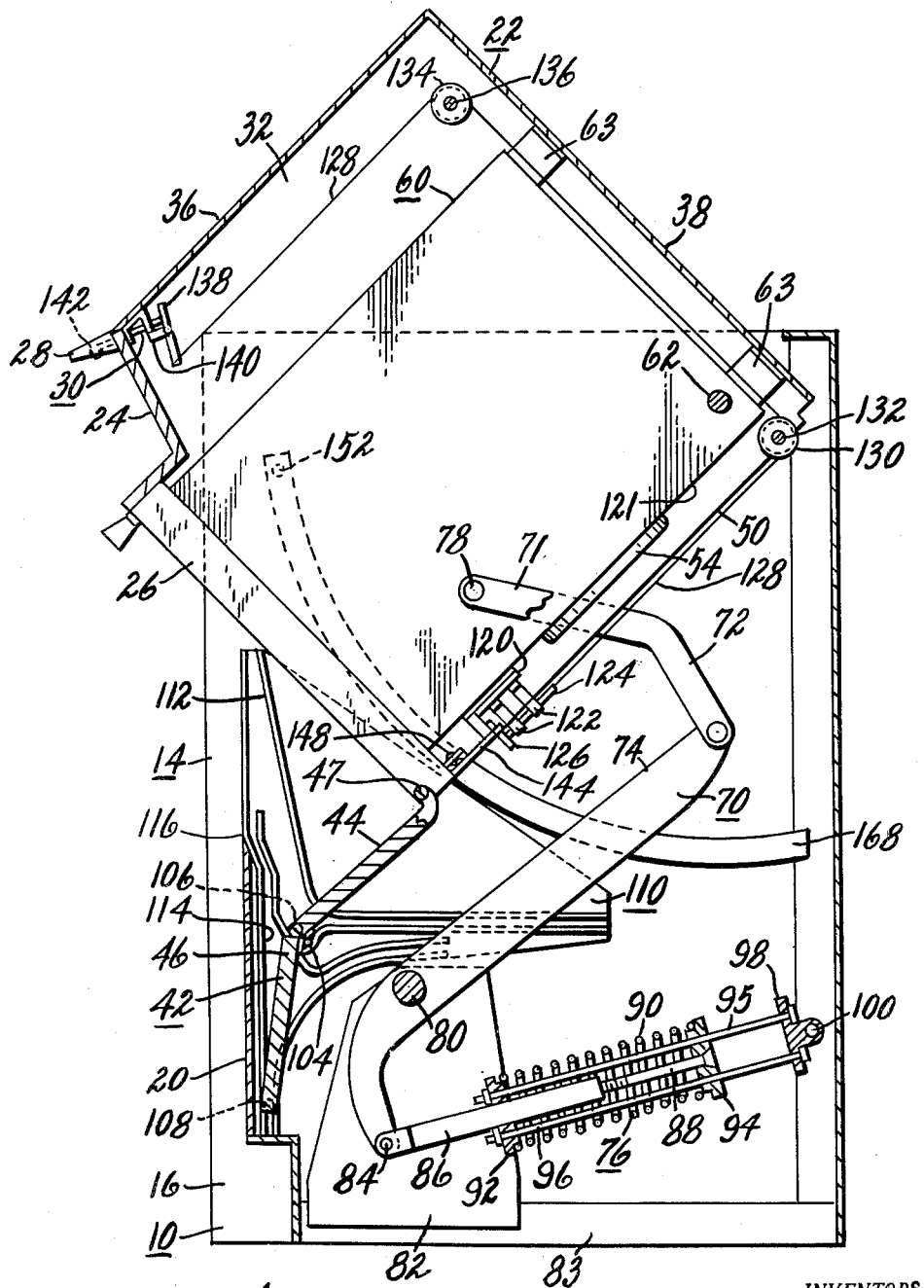

INVENTORS
MARTHA J. VAN ALSTYNE
PAUL F. POWDER
BY Frederick M Ritchie
THEIR ATTORNEY March 27, 1962 M. J. VAN ALSTYNE ET AL 3,027,216
CONCEALABLE BUILT-IN OVEN
Filed Sept. 2, 1960 5 Sheets-Sheet 5
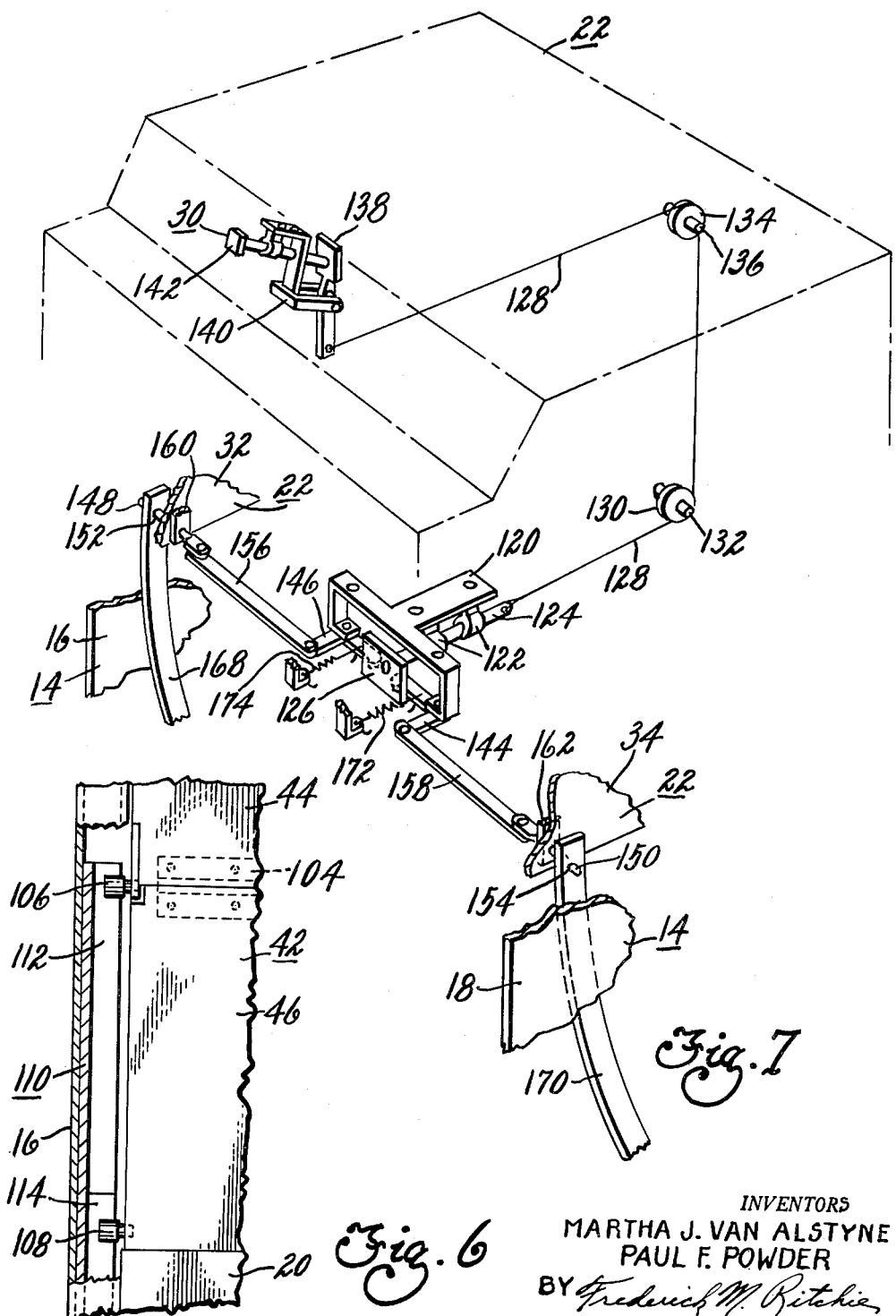
INVENTORS
MARTHA J. VAN ALSTYNE
PAUL F. POWDER
BY Frederick M. Ritchie
THEIR ATTORNEY

United States Patent Office 3,027,216
Patented Mar. 27, 1962

3,027,216
CONCEALABLE BUILT-IN OVEN
Martha J. Van Alstyne, Birmingham, and Paul F. Powder, Southfield, Mich., assignors to General Motors Corporation, Detroit, Mich., a corporation of Delaware
Filed Sept. 2, 1960, Ser. No. 53,761
4 Claims. (Cl. 312—271)

This invention relates to a domestic appliance and more particularly to a concealable built-in oven.

The trend in built-in appliances is toward cooking units which may be moved to concealed or out-of-the-way positions when not in use. Such appliances may be designed to instal snugly against adjacent kitchen cabinets, such that a concealed appliance will align smoothly and coplanarly with adjacent cabinet surfaces.

Accordingly, it is an object of this invention to provide an oven which may be moved between a concealed or stowed position and a raised operating position.

A further object of this invention is to provide a concealable oven having an interior cooking unit of the surface type for frying—the sides of the oven serving as shields to prevent spatter on the kitchen walls.

A more specific object of this invention is the provision of a concealable oven which is pivotally mounted in a line of base cabinets for movement between a stowed position and a raised position overlying the stowed position.

A more general object of this invention is the provision of an oven which is pivotally contained in a kitchen base cabinet for movement thereabove to an operating position.

Another object of this invention is the provision of a counterbalanced linkage for aiding in the movement of said oven between a stowed position and a raised operating position.

Further objects and advantages of the present invention will be apparent from the following description, reference being had to the accompanying drawings wherein a preferred embodiment of the present invention is clearly shown.

In the drawings:

FIGURE 1 is a perspective view of the oven appliance installed adjacent base cabinet structure with the oven in its operating position;

FIGURE 2 is a perspective view of the oven appliance with the oven in its stowed or concealed position;

FIGURE 3 is a sectional view partly in elevation with the oven in its raised operating position;

FIGURE 4 is a view similar to FIGURE 3 with the oven intermediate its stowed and operating positions;

FIGURE 6 is a fragmentary sectional view taken along line 6—6 in FIGURE 3; and

FIGURE 7 is a fragmentary perspective view of the oven latch mechanism.

Figure 5:
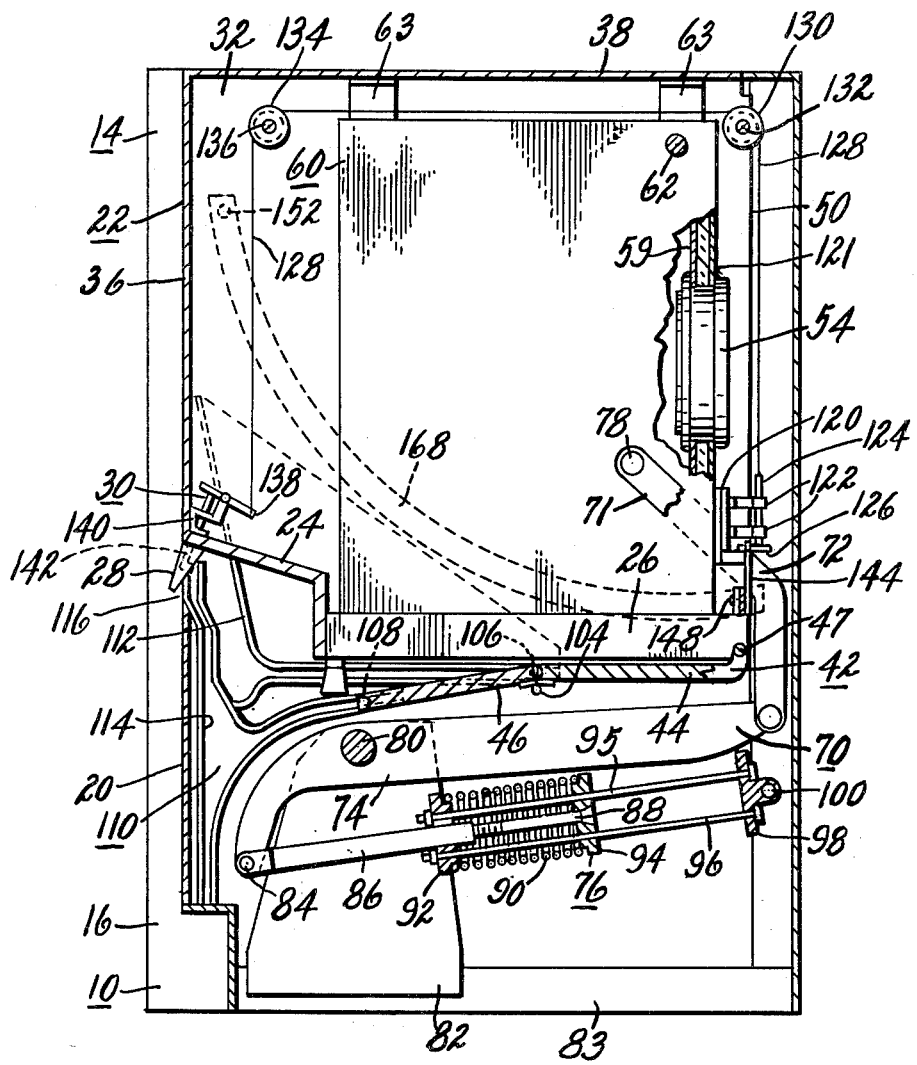
FIGURE 5 is a view similar to FIGURE 3 with the oven in its stowed position.

In accordance with this invention and with reference to FIGURE 1, a kitchen oven appliance 10 is shown installed in side by side relationship with a base cabinet or free standing range 12. The oven appliance 10 is designed with a storage cabinet portion 14 having sidewalls 16 and 18 and a lower front wall 20 interconnecting the sidewalls 16 and 18 at the front of the cabinet. The cabinet 14 is designed to enclose and support an oven compartment portion 22 which moves between a raised operating position shown in FIGURE 1 and a concealed, closed or stowed position shown in FIGURE 2.

The oven compartment 22 encloses an insulated oven liner 60 (FIGURE 3) attached thereto by brackets 63 and includes a control panel 24 and a horizontally hingedly mounted oven door 26 adapted to close a front opening of the oven liner. For guiding the oven compartment 22 in its pivotal motion between stowed and raised positions, a handle 28 is provided at the top thereof—a latch seen generally at 30 being conveniently positioned adjacent the handle 28 to release the latch mechanism so that the oven compartment may be lowered.

The oven compartment 22 is comprised of a boxlike outer casing having sidewalls 32, 34, a top wall 36 and a rear wall 38. Note that the rear wall 38 aligns flush with the adjacent countertop when the oven compartment 22 is in the stowed or concealed position of FIGURE 2. With reference to FIGURE 1, a foldable shield or cover panel 42 having an upper portion 44 hingedly joined to a lower portion 46 is carried by the oven compartment 22 and utilized to close the opening formed at the front of the storage cabinet 14 between the bottom 50 of the oven compartment casing and the upper edge of the cabinet front wall 20. The shield 42 moves and straightens into position automatically in response to the movement of the oven compartment 22 to its raised position as will be described more fully hereinafter.

Note in FIGURES 1 and 5 that the oven compartment 22 is designed to include an auxiliary burner or surface cooking unit 54 attached to the inner bottom wall 59 of the oven liner 60. The cooking unit 54 may be utilized in conjunction with the range shown in phantom at 12. In this way, a surface cooking operation, such as frying, may be performed inside the oven liner—the sides, back and top of the oven liner 60 acting as shields for protecting the kitchen walls from the spatter of the cooking operation. To make it more convenient to stand in front of the oven while using the inside burner 54, mechanism may be provided for dropping the oven door 26 downwardly to a vertical out-of-the-way position as taught in the copending application S.N. 701,395, filed December 9, 1957, assigned to the same assignee as this invention.

For details as to the counterbalancing linkage arrangement for supporting the oven in its movement, reference may be had to FIGURES 3, 4 and 5. The oven compartment 22 encloses and supports the oven liner 60 and the entire oven assembly of compartment 22 and liner 60 is pivotable about a rod 62 which runs transversely between and is affixed to storage cabinet sidewalls 16 and 18.

Although the oven compartment and liner assembly is supported at each side by identical counterbalance linkages, the description will be given in connection with the left side only, it being understood that an identical mirrored arrangement is provided at the other side thereof.

As set forth hereinbefore, the oven compartment assembly is pivotally mounted for movement about a transverse shaft or rod 62 or shaft stubs carried by the sidewalls 16 and 18 of the oven storage cabinet 14. For counterbalancing the weight of the assembled oven compartment 22 and liner 60 during pivotal movement thereof, a counterbalance linkage arrangement 70 is best seen in FIGURE 3. The linkage arrangement is comprised of a dog leg-shaped upper link 72 (note that a fragment of the right-hand upper link 71 is shown pivotally attached to the right-hand sidewall of the liner 60 which is in elevation), an intermediate or center link 74 and a counterbalance assembly shown generally at 76. The upper link 72 is pivotally connected, as is right-hand upper link 71 at 78, to the left sidewall of the oven liner 60. It should also be obvious that the link 72 could as well be pivotally attached to the sidewall 32 of the oven compartment 22, appearance and wall strength being somewhat the guiding factors in this regard. The intermediate or center link 74 is pivotally mounted at 80 on a linkage support bracket 82 secured to the storage cabinet frame 83 adjacent the left sidewall 16 of the cabinet 14. The upper end of the center link 74 is pivotally attached to the lower end of the upper link 72. At its lower end, the center link 74 is fastened at 84 to the counterbalance assembly 76.

The counterbalance assembly 76 is comprised of a central compression rod 86 having a relatively axially movable threaded portion 88 which may be threaded into the compression rod 86 in order to adjust the counterbalancing force of the assembly 76. A compression spring 90 is retained between a left-hand spring retainer 92 and a movable right-hand spring retainer 94. The threaded adjustment portion 88 is relatively rotatably seated in the spring retainer 94 and movable with the compression rod 86 to compress the spring 90. Guide rods 95 and 96 connect the left-hand spring retainer 92 with a counterbalance assembly support piece 98 which is pivotally fastened at 100 to the frame 83 of the cabinet 14. As the oven compartment 22 moves from its raised position in FIGURE 3, through its intermediate position in FIGURE 4 to its stowed or concealed position in FIGURE 5, note that the counterbalance spring 90 is compressed between the retainers 92, 94 to counterbalance the weight of the oven liner 60 and compartment 22. For more or less counterbalancing force, the threaded portion 88 may be threaded into or out of the compression rod 86 to lengthen or shorten the overall length of the rod as the means of adjusting the compression applied to the spring 90 during movement of the oven compartment 22.

During movement of the oven compartment 22 to and from its concealed position within the storage cabinet 14, a foldable front panel or shield 42 is guided into its proper position to close the gap between the bottom of the oven compartment 22 and the top of the cabinet front panel 20. As aforesaid, the foldable shield or cover 42 is comprised of an upper panel 44 which is connected by a piano hinge 104 along the mating juncture of the upper and lower panels 44 and 46. The upper panel 44 is pivotally connected as at 47 at each upper corner to the oven compartment 22 adjacent the oven door 26. At each lower corner of the upper panel 44, there is an upper panel guide roller 106 (FIGURE 6). Similarly, at the bottom of the lower panel 46, there is a lower panel guide roller 108. These rollers guide the shield 42 into its proper position as the oven compartment 22 is raised and lowered. To guide and restrict the movement of the rollers 106 and 108, a roller guide channel track support bracket 110 is secured to the storage cabinet sidewall 16. The bracket 110 is formed with channel walls to define an upper track 112 for guiding the roller 106 and a lower track 114 for guiding the lower panel guide roller 108. The tracks 112 and 114 are irregularly formed to store the foldable shield 42 and to position the panels of the shield into covering relationship with the opening 116 beneath the oven compartment 22 when in its raised position. Here again it should be understood that a similar guide channel track support bracket 110 is mirrored on the right wall 18 of the cabinet 14, thereby guiding the shield 42 at both sides thereof. The FIGURES 3, 4 and 5 show the movement of the cover shield and the followers 106 and 108 on the guide or channel tracks 112 and 114 respectively. Such guided movement prevents the shield from becoming stuck and aids in the smooth even movement thereof between the stored position of FIGURE 5 and the operating position of FIGURE 3.

The latch arrangement for locking the oven compartment 22 in its raised position will now be clearly described with reference to FIGURES 3 and 7. The latch assembly 30 is comprised of a latch support bracket 120 fastened to the underside or bottom wall 121 of the oven liner 60. Depending from the bracket 120 are bearings 122 for guiding a shaft portion 124 of the latch actuator bar 126. The latch actuator bar 126 is motivated by a cable 128 which is strung around the rear pulley side of the oven liner 60 by means of a lower latch pulley 130 relatively rotatably secured to a transverse rod 132 extending between the sides 32 and 34 of the oven compartment 22.

Similarly, the cable 128 is carried over an upper latch pulley 134 relatively rotatably carried on an upper transverse rod 136 also supported by the sidewalls 32 and 34 of the oven compartment 22. A trip lever 138 has one end thereof fastened to the latch cable 128 and is pivotally mounted in a fixed bracket 140 carried by the front panel 24 of the oven compartment. When a latch trigger 142 is depressed, the cable 128 is tensioned to pull on the latch actuator 126. This in turn works through a pair of pivotally mounted bell crank levers 144 and 146 to withdraw the left-hand latch bolt 148 and the right-hand latch bolt 150 from keeper ports 152, 154 respectively. Interconnecting the left-hand bell crank 146 with the latch bolt 148 is a connecting link 156. At the right side of the latch mechanism a link 158 serves the same purpose in interconnecting the latch bolt 150 with the right-hand bell crank 144. The left-hand sidewall 32 of the oven compartment 22 is reinforced with a bushing 160 to serve as a guide for the latch bolt in its movement through the compartment wall. Similarly, a bushing 162 is affixed to the right-hand compartment wall 34. The keeper ports 152 and 154 are formed respectively in a left-hand latch bolt glide bar 168 and a right-hand latch bolt glide bar 170 which are carried by the cabinet frame and supported adjacent the sidewalls 16 and 18 of the storage cabinet 14. Thus, when the latch trigger 142 is depressed to withdraw the bolts 148 and 150 from their respective keeper ports, the entire oven compartment 22 is free to pivot downwardly against the restraining bias of the counterbalancing mechanism 70 to its stored position of FIGURES 2 and 5. Spring means 172 and 174 affixed at one end thereof to the liner bottom wall 121 and at their other end to the bell crank levers 144 and 146 are designed to bias the latch mechanism to its normally closed position. This further urges the latch bolts 148 and 150 into the keeper ports 152 and 154 when the oven compartment 22 is pivoted to its raised position. Note that the snub noses of the latch bolts move along the latch bolt glide bars 168 and 170 as the oven compartment 22 is pivoted between raised and stowed positions.

It should now be seen that an improved concealable oven has been taught wherein a countertop mounted oven is positioned between a raised operating position and a lowered stored or stowed position—the back wall of said oven serving as an extension of the adjacent countertops in which the appliance is installed. The concealable oven is designed to store and operate in the same counter surface area by utilizing a novel 90° rotation between operating and stored positions. Further, the concealable oven of this invention may be adapted to contain an auxiliary surface burner wherein cooking can be accomplished inside the oven—the walls of the oven serving to prevent spatter from reaching the surrounding kitchen walls.

While the embodiment of the present invention, as herein disclosed, constitutes a preferred form, it is to be understood that other forms might be adopted.

What is claimed is as follows:

1. An appliance adapted for installation in a line of base cabinets comprising a storage cabinet having a pair of sidewalls and a front wall interconnecting said sidewalls below the top of said sidewalls to form a front opening and a top opening, one of said sidewalls having first and second track means, an oven compartment having side and bottom panels and an access opening, a horizontally pivotally mounted door for closing said access opening, said oven being pivotally movable through not more than 90° between a stowed position within said cabinet and a raised position substantially without said cabinet above the top of said front wall, means for supporting said oven in said movement including a first link having one end pivotally connected to said side panel, a second link pivotally connected to said one of said sidewalls intermediate the ends of said second link and having an upper end connected to the free end of said first link and a lower end and a counterbalancing device pivotally connected to said one of said sidewalls and extending into pivotal engagement with said lower end of said second link, a shield for closing said front opening when said oven is in said raised position, said shield including an upper portion pivotally depending from said side panel at the front of said side panel and having a first follower, a lower portion hingedly connected to said upper portion and having a second follower, said first follower moving along said first track means and said second follower moving along said second track means when said oven is being moved between said stowed and raised positions, and means for selectively latching said oven in said raised position.

2. The combination of claim 1 wherein said latching means includes a bolt, a bolt glide and keeper on said one of said sidewalls, a bolt actuator on the bottom of said oven compartment, a trigger on the top of said oven compartment, and cable means interconnecting said trigger and said bolt actuator, whereby manipulation of said trigger will withdraw said bolt from said keeper to permit the stowing of said oven compartment through said top opening.

3. The combination of claim 1 wherein said counterbalancing device includes a support piece pivotally connected to said one of said sidewalls, a coil spring, a first spring retainer at one end of said spring, means for spacing said first spring retainer from said support piece, a second spring retainer at the other end of said spring and movably interposed between said first spring retainer and said support piece, and a rod having a first portion extending through the center of said coil spring and said first spring retainer into pivotal engagement with said lower end of said second link and a second portion relatively rotatably seated in said second spring retainer, said second portion being threadedly engageable with said first portion to adjust the length of said rod.

4. An appliance adapted for installation in a line of base cabinets comprising a storage cabinet having a pair of sidewalls and a front wall interconnecting said sidewalls below the top of said sidewalls to form a front opening and a top opening, one of said sidewalls having first and second track means, an oven assembly having side and bottom panels, said oven assembly being pivotally movable through at least 90° between a stowed position within said cabinet and a raised position substantially without said cabinet above the top of said front wall, means for supporting said oven assembly in said movement including a first link having one end pivotally connected to said side panel, a second link pivotally connected to said one of said sidewalls intermediate the ends of said second link and having an upper end connected to the free end of said first link and a lower end and a counterbalancing device pivotally connected to said one of said sidewalls and extending into pivotal engagement with said lower end of said second link, and a shield for closing said front opening when said oven is in said raised position, said shield including an upper portion pivotally depending from said side panel and having a first follower, a lower portion hingedly connected to said upper portion and having a second follower, said first follower moving along said first track means and said second follower moving along said second track means when said oven is being moved between said stowed and raised positions.

References Cited in the file of this patent
UNITED STATES PATENTS
2,210,361   Davis _____ Aug. 6, 1940